Patented Sept. 8, 1925.

1,552,836

UNITED STATES PATENT OFFICE.

WALTER FRIEDERICH, OF TROISDORF, NEAR COLOGNE-ON-THE-RHINE, GERMANY.

PRIMING COMPOSITION AND PROCESS FOR PRODUCING THE SAME.

No Drawing.   Application filed October 12, 1921. Serial No. 507,334.

*To all whom it may concern:*

Be it known that I, WALTER FRIEDERICH, citizen of Germany, residing at Troisdorf, near Cologne-on-the-Rhine, Republic of Germany, have invented new and useful Improvements in Priming Compositions and Processes for Producing the Same, of which the following is a specification.

This invention relates to improved primer compositions and to processes for producing the same. It is already known to employ the salts of heavy metals of hydrazoic acid as initiating priming composition. Furthermore, a process is already known for producing lead azide suitable as detonating charge. It is also well known that it is very difficult to obtain lead azide in the granular crystalline form suitable for employment in the usual primers, as this body is inclined to separate from solutions in the form of scales or long needles. Such lead azide is very sensitive and when used as a charge for primings it may happen in mass production that cartridges receive an unsufficient or no charge at all.

It has now been ascertained that heavy metal azides show isomorphism or form double salts with numerous other bodies. Amongst these double salts may be mentioned: basic heavy metal-azides, heavy metal hydroxides, carbonates, basic chlorides and sulphates, neutral and basic salts of nitrated phenols and other nitro-bodies, as for instance mono-, di-, and tri-nitro phenols, di- and trinitro resorcin, trinitro cresol, hexanitro diresorcin, trinitro-phloroglucin, trinitroamino phenol, m-dinitro-o-dinitrosobenzol, hexanitro diphenylamine and so on. Furthermore heavy metal azides show isomorphism among themselves. Such bodies which show similar solubility as the heavy metal azides form particularly easily double salt-like bodies. The number of constituents of such double salt-like bodies need not be limited to two, but may reach any desired figure. It is for instance possible to produce crystal powders which consist of basic lead azide and lead azide of carbonate of lead and lead azide or of basic lead azide, carbonate of lead and lead azide.

Basic lead azide is obtained by the gradual mixture of a lead acetate solution containing basic lead acetate or of a strongly diluted lead acetate solution which is considerably hydrolytically divided, with a sodium azide solution under stirring or in motion. A corresponding quantity of an alkaline solution or ammonia may also be added to the sodium azide solution and this solution may be introduced into the lead acetate solution under constant stirring. Instead of lead acetate, lead nitrate and other lead salts may be employed. If carbonate of sodium is added to the sodium azide solution uniform crystals are obtained which contain carbonate of lead. If the solutions are sufficiently diluted or if the lead acetate solutions contain basic lead acetate, lead hydroxide or basic lead azide is also contained in the crystals.

A portion of the isomorphic salts have the great advantage over the pure lead azide that the length and depth of the crystals and groups of crystals does not so much differ from their width that a strong adhesion of the individual crystals can take place, but a tumbling and running over of the crystals takes place, as for instance in the case of dry sand. Only a few percents of basic lead azide or carbonate of lead already suffice to bring about a considerable improvement in this direction in the lead azide. Thus the isomorphic salts are well adapted to be charged into cartridges. The explosive force at a content of only 70–80% lead azide and at 20–30% inexplosive constituents is peculiarly little reduced and is quite immaterial, for instance, for the employment as initiating priming for blasting cartridges. The sensitiveness against blows, compression and friction is, however, considerably increased, whereby the danger during the charging of the cartridges is reduced and the safety in handling the charged cartridges is increased.

Many bodies reduce the sensitiveness, a few increase it. By a judicious choice of bodies to take part in the crystallization and their quantity, the bursting power of the priming compositions may be regulated.

The bursting power may thus be adapted to the object of the priming and primings may be produced which are particularly suitable for blasting cartridges, primers for firearms and guns, together with phlegmatizing agents as wax, paraffin and so on for detonating fuses, Flobert ammunition and other initiating priming of all kinds. For blasting cartridges, for instance, a detonator will be employed, which has a high content of lead-azide, for Flobert ammunition such which contain only very little azide of heavy metals besides a large quantity of explosive, less blasting salts, as for instance, heavy metal salts of highly nitrated phenols and other nitro bodies. By way of example the following isomorphic salts may be stated:

(1) 95% lead azide, $PbN_6$ + 5% basic lead azide $Pb(OH)N_3$.

(2) 85% lead azide $PbN_6$ + 10% basic lead azide $Pb(OH)N_3$ + 5% carbonate of lead $PbCO_3$.

(3) 70% lead azide $PbN_6$ + 30% lead trinitroresorcinate. $Pb(C_6H(NO_2)_3O_2H_2O$.

(4) 70% lead azide $PbN_6$ + 10% basic lead azide + 20% basic lead trinitroresorcinate. $Pb_2(OH)_2(C_6H)(NO_2)_3O_2$.

(5) 70% lead azide $PbN_6$ + 10% basic lead trinitrophenolate $C_6H_2(NO_2)_3PbOH$, 10% basic lead trinitrocresolate
$$C_6HCH_3(NO_2)_3PbOH,$$
10% lead trinitroresorcinate
$$C_6H(NO_2)_3O_2(PbOH)_2.$$

(6) 25% lead azide $PbN_6$ + 75% basic lead triaminophenolate $C_6H.NH_2(NO_2)OPbOH$.

(7) 7% lead azide $PbN_6$ + 93% lead trinitrocresolate $C_6HCH_3(NO_2)_3.PbOH$.

Such isomorphic salts are produced by the gradual addition of solutions of suitable bodies or their salts, either by themselves or in mixture with solutions of easily soluble azides to solutions of salts of lead. In the production of double salts or isomorphic salts containing basic salts, the addition of alkalies is generally required. The mixture of the liquids may naturally also be effected in different succession. It may take place at ordinary or at raised temperatures.

The process may be modified by superimposing upon the crystals of azide crystals of other salts, so that the azide crystals contained in the core are enclosed by the crystals of other salts. In the reverse way the crystals of explosive salts may have superimposed on them crystals of azide. Furthermore, mixed crystals of azide of different content of azide may be superimposed and surrounded by crystals free of azide and vice versa. Such superimposed crystals are obtained by washing the core crystals in the solution to be precipitated and effecting the precipitation normally, as already described. The solutions may also be changed stepwise. If, for instance, lead azide is to be coated with lead azide basic lead picrate of different contents of azide and finally with basic lead picrate, sodium azide solution is poured into a solution of acetate of lead or nitrate of lead under vigorous stirring. After a third (⅓), a half (½) or two thirds of the sodium azide solution has been poured into the lead solution, a solution which contains for each molecule of sodium picrate one molecule of sodium hydroxide is then poured into the receptacle which contains the remaining solution of sodium azide. In this way crystals with a core of lead azide are obtained. Starting from the core the content of azide continually decreases until it finally disappears altogether on the surface and the surface layer of the crystals consists of basic lead picrate only.

The process described has the great advantage that the mixtures hitherto employed for many purposes may be replaced by uniform homogeneous bodies, the bursting power and sensitiveness of which may be regulated within rather wide limits. This was not possible hitherto, as bodies of definite properties had always to be dealt with, the bursting power and sensitiveness of which could be changed only within very narrow limits by the admixture of other explosives. If now the sizes of the grain of sensitive constituents, which could not be reduced, changed, no sufficient uniformity of the priming compound could be guaranteed, in spite of the most careful mixture. Mixed mercury fulminate priming compounds as employed hitherto could only be stored for a short time, as their main constituent, the fulminate of mercury is very sensitive to humidity and other atmospheric influences and a mechanical mixture is generally more liable to change under these influences than a chemical compound. The improved priming compositions have the great advantage that they may be stored on non-precious metals for a very long time. It is thus possible to employ for the manufacture of cartridges besides the hitherto employed metals zinc, iron, aluminum and their alloys.

It will be understood that I do not limit myself to the materials mentioned or the exact proportions stated by way of example.

What I claim as my invention and desire to secure by United States Letters Patent is:—

1. A process for the manufacture of priming compositions for all purposes, comprising producing a mixture of crystals of lead azide and explosive and nonexplosive lead salts by slowly pouring solutions of alkali metal azides and solutions of alkali metal salt forming nitrobody salts and other alkali metal salt, into solutions of lead salts.

2. A process for the manufacture of priming compositions for all purposes, comprising producing a mixture of crystals of lead azide and explosive and nonexplosive lead salts by slowly pouring mixed solutions of alkali metal azides with alkali metal salts of nitrobodies into solutions of lead salts.

3. A process for the manufacture of priming compositions for all purposes, comprising producing a mixture of crystals by slowly pouring into a suspension of lead azide in a lead salt solution first a mixed solution of sodium azide, alkali salt of nitrobodies and alkali metal hydroxide and then a solution which contains nitrobody salts of alkalies and alkali metal hydroxide.

4. As a new article of commerce an improved priming composition, comprising crystals of lead azide mixed with other lead salts.

In testimony whereof I have signed my name to this specification.

Dr. WALTER FRIEDERICH.